No. 675,972. Patented June 11, 1901.
F. F. RAYMOND, 2d.
PASTE POT OR JAR.
(Application filed Jan. 7, 1901.)
(No Model.) 2 Sheets—Sheet 1.

WITNESSES: INVENTOR:

No. 675,972. Patented June 11, 1901.
F. F. RAYMOND, 2d
PASTE POT OR JAR.
(Application filed Jan. 7, 1901.)
(No Model.) 2 Sheets—Sheet 2.

WITNESSES: INVENTOR:

UNITED STATES PATENT OFFICE.

FREEBORN F. RAYMOND, 2D, OF NEWTON, MASSACHUSETTS, ASSIGNOR TO THE CARTER'S INK COMPANY, OF BOSTON, MASSACHUSETTS.

PASTE POT OR JAR.

SPECIFICATION forming part of Letters Patent No. 675,972, dated June 11, 1901.

Application filed January 7, 1901. Serial No. 42,385. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Paste Pots or Jars, of which the following is a full, clear, and exact description, reference being had to the accompanying drawings, forming a part of this specification, in explaining its nature.

My invention is applicable to a construction of paste pot or jar in which the paste-holding chamber is formed by a wall integral with the jar and in which the paste-holder is made removable and also to a paste pot or jar in which there are two water-chambers, one for moistening the brush and holding it and the other for holding water adjacent to the paste-chamber for providing it with moisture of evaporation, or to a jar in which the brush-chamber and the evaporating-chamber are in common.

Figure 1:
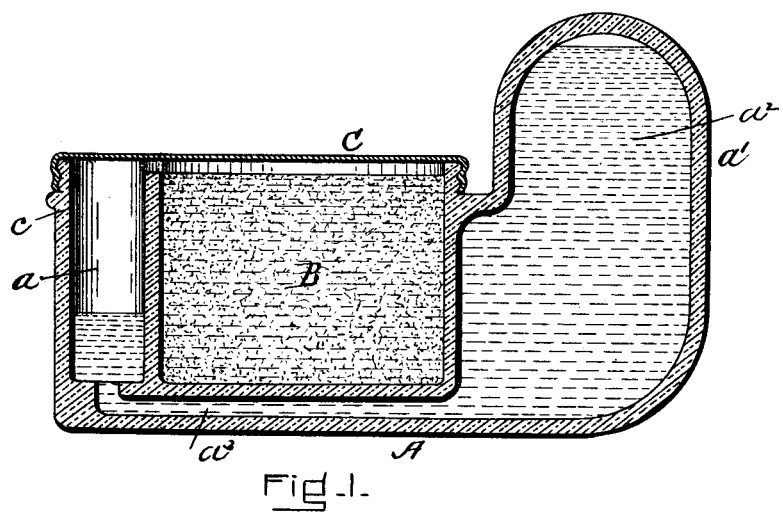

In Figure 1 I have shown the invention as embodied in a jar which has a fixed paste-holder and a brush water-chamber which is also an evaporating-chamber. In Figs. 2, 3, 4, and 5 the jar is represented as provided with a removable paste-holder and as having both water-chambers. The brush water-chambers of Figs. 4 and 5 also serve as evaporating-chambers.

I will now describe the invention in connection with the drawings, wherein—

Figure 2:
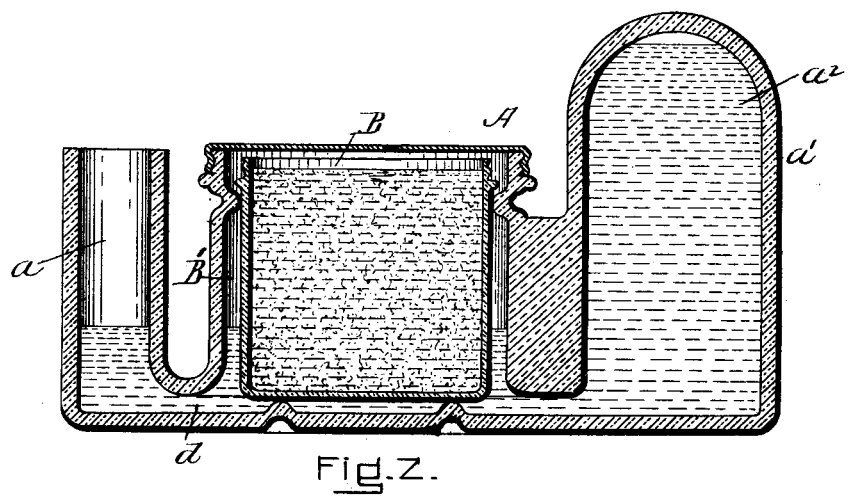
Figure 3:
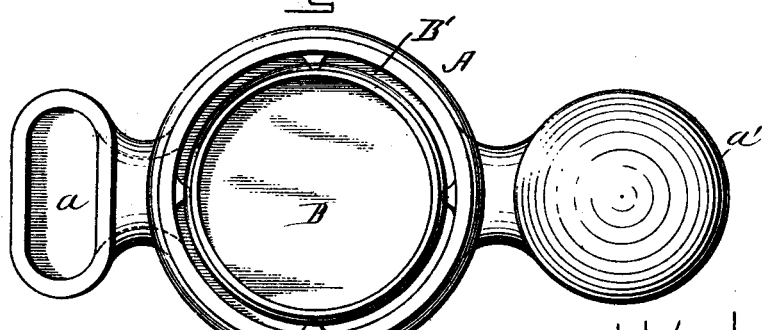
Figure 4:
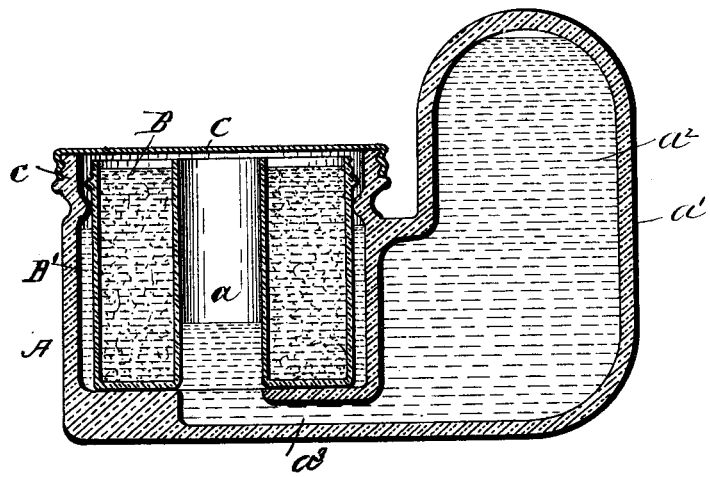
Figure 5:
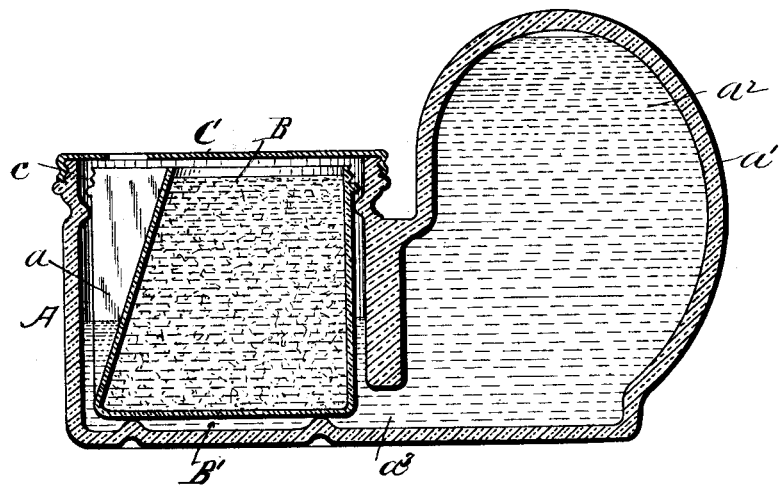

Fig. 1 is a view in vertical central section of my improved paste pot or jar. Fig. 2 is a view in vertical central section of a modified form of the paste pot or jar. Fig. 3 is a view in plan of the form shown in Fig. 2. Figs. 4 and 5 show in vertical section further modifications of the invention, to which further reference will be made.

Referring to the drawings, A represents the paste pot or jar, and $a$ is a brush water-chamber wherever it may be located.

B is the paste-holding chamber, and B' is the water-evaporating chamber. The brush water-chamber $a$ may be at one side of the paste-chamber, as represented in Figs. 1, 2, 3, and 5, or it may be within the paste-chamber in whole, as represented in Fig. 4, or in part, as represented in Fig. 5, or otherwise located with respect to it. The evaporating-chamber, when separated from the brush water-chamber, may surround it, as represented in Figs. 2, 3, 4, and 5, or may be combined with the brush water-chamber, as represented in Fig. 1, or may be connected directly with it, as represented in Fig. 5. These features have been shown, described, and claimed in other applications of mine and need not be further described here.

$a'$ is a portion of the paste pot or jar which is shaped to provide an air-tight shell or dome, a portion of which extends above the upper level of the pot or jar and the outlet from which is at or near the bottom of the paste pot or jar. It forms an air-tight water reservoir or chamber $a^2$, in which water is adapted to be held by atmospheric pressure at any desired height, according as it may be filled, and the level of which water is always higher than the level of the water in the chamber or chambers with which it may be connected and which it serves to automatically feed or supply with water. It may be connected with the brush water-chamber alone to wholly supply it, or it may be connected with the evaporating-chamber alone to wholly feed it, or it may be connected with both the brush water-chamber and the evaporating-chamber. $a^3$ is the passage which connects its lower end with either or both chambers. In Figs. 1 and 4 it is shown as connected with the chamber which is primarily the brush water-chamber. In Figs. 2 and 5 it is represented as connecting the reservoir with both chambers.

C is a cover which may be used to cover both the brush water-chamber and the paste-holder, as represented in Fig. 1, where it fits the wall $c$, covering the paste-holder and the brush-holding chamber, or it may serve to cover the evaporating-chamber and paste-holder, as represented in Fig. 2, or it may cover the brush water-chamber, evaporating-chamber, and paste-holder, as represented in Figs. 4 and 5.

In use the reservoir $a^2$ is filled with water, the air in it being allowed to escape from it while it is being filled, and upon being turned to an upright position the water will flow from the reservoir into the chamber or chambers with which it is connected and will rise to a height lower than the level of the water in the reservoir. There is thus provided a means for supplying either or both chambers automatically with a relatively large volume of water, which is fed to it or them as it is needed.

In Fig. 4 I have shown a construction in which an evaporating-chamber adjacent to the paste-holder is shown, but which is not connected with the brush water-well or fountain-reservoir and which is adapted to hold water at a relatively high level.

Having thus fully described my invention, I claim and desire to secure by Letters Patent of the United States—

1. A paste pot or jar containing therein a paste-holder, a brush-holder, and a water-reservoir, and a passage connecting said water-reservoir and said brush-holder, as set forth.

2. A paste pot or jar containing a paste-holder, an evaporating-chamber, a water-reservoir and a brush-holder, and a passage connecting said water-reservoir with said water-evaporating chamber and said paste-chamber, as and for the purposes set forth.

3. A paste pot or jar containing a paste-holding chamber, an evaporating-chamber, and a brush-holding chamber, and means for automatically supplying said evaporating-chamber and said brush-holding chamber with water, and said brush-holder and said evaporating-chamber being suitably connected and adapted to furnish water to said paste-chamber, as set forth.

4. A paste pot or jar having a paste-holder, a water-chamber, said paste-holder being located within said water-chamber, and a brush-holder and means for supplying water automatically to said brush water-chamber and evaporating-chamber, as set forth.

FREEBORN F. RAYMOND, 2D.

In presence of—
J. M. DOLAN,
SAUL SIPPERSTEIN.